Nov. 8, 1955 D. FIRTH 2,722,842
VARIABLE PITCH SHEAVE INDICATORS
Filed Aug. 14, 1953 6 Sheets-Sheet 2
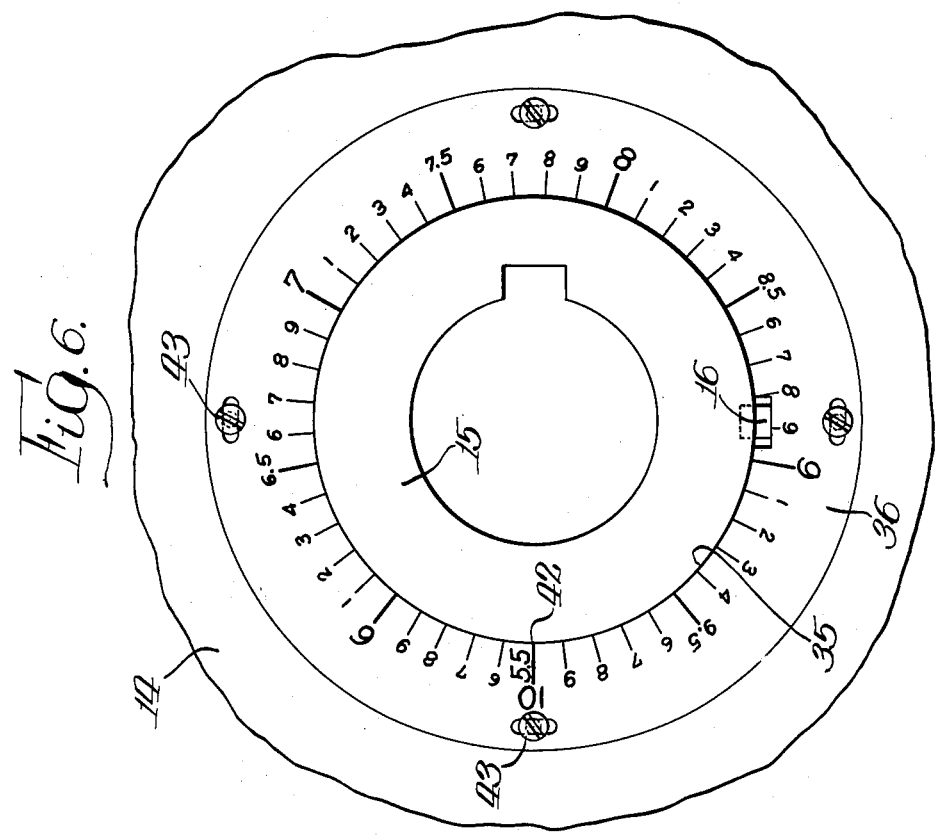
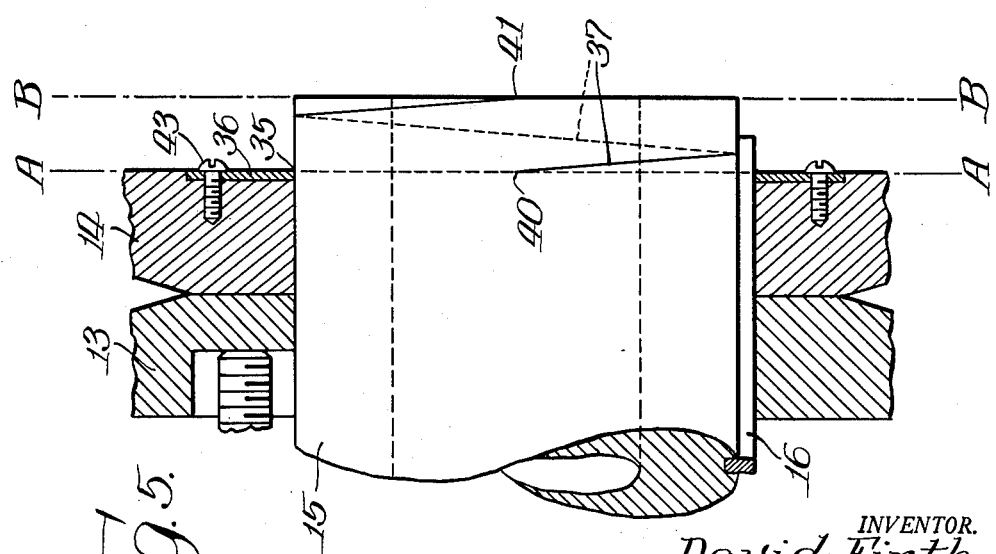
INVENTOR.
David Firth,
BY
Osgood H. Dowell
Atty.

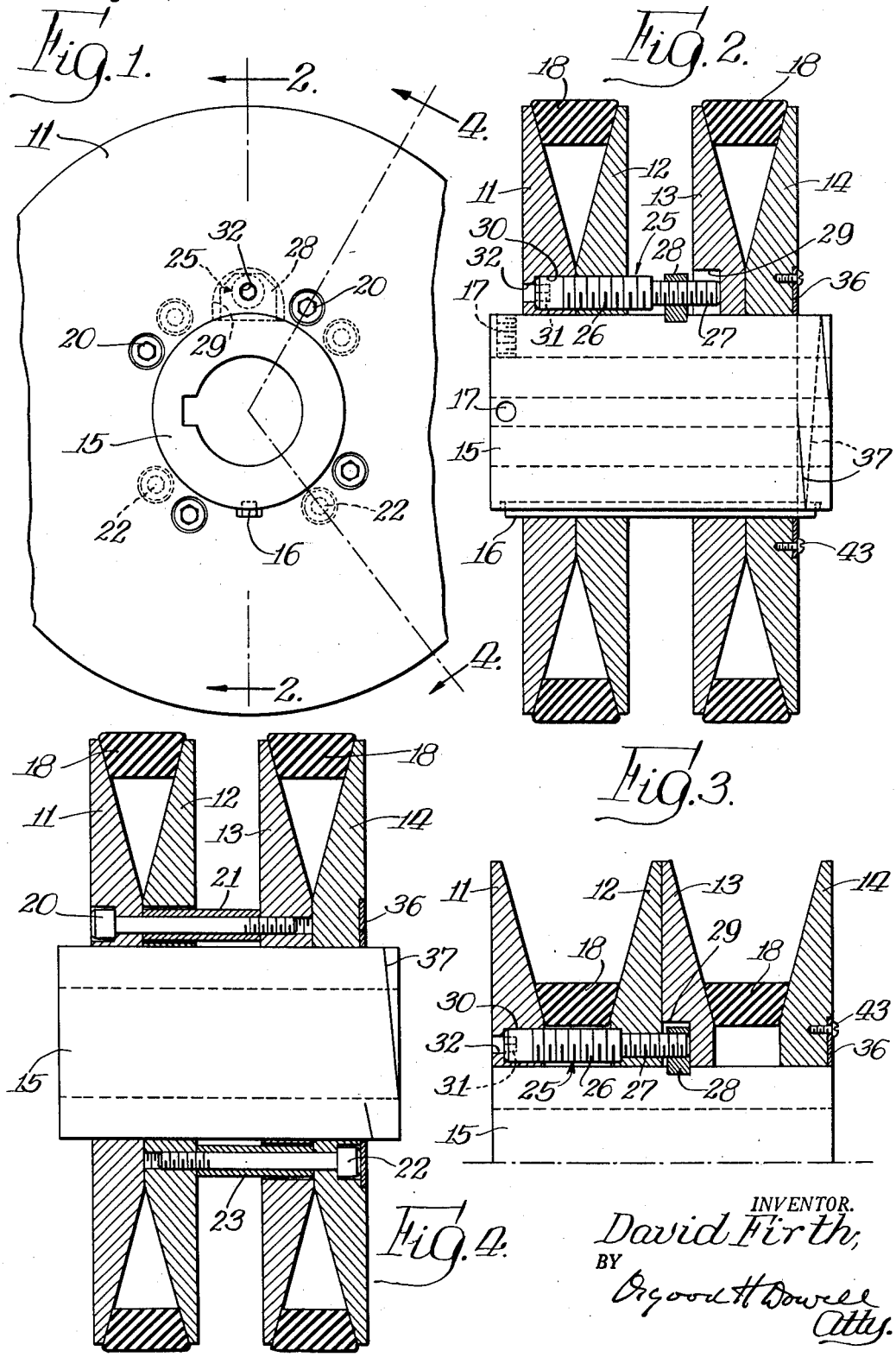

Nov. 8, 1955  D. FIRTH  2,722,842
VARIABLE PITCH SHEAVE INDICATORS
Filed Aug. 14, 1953  6 Sheets-Sheet 3
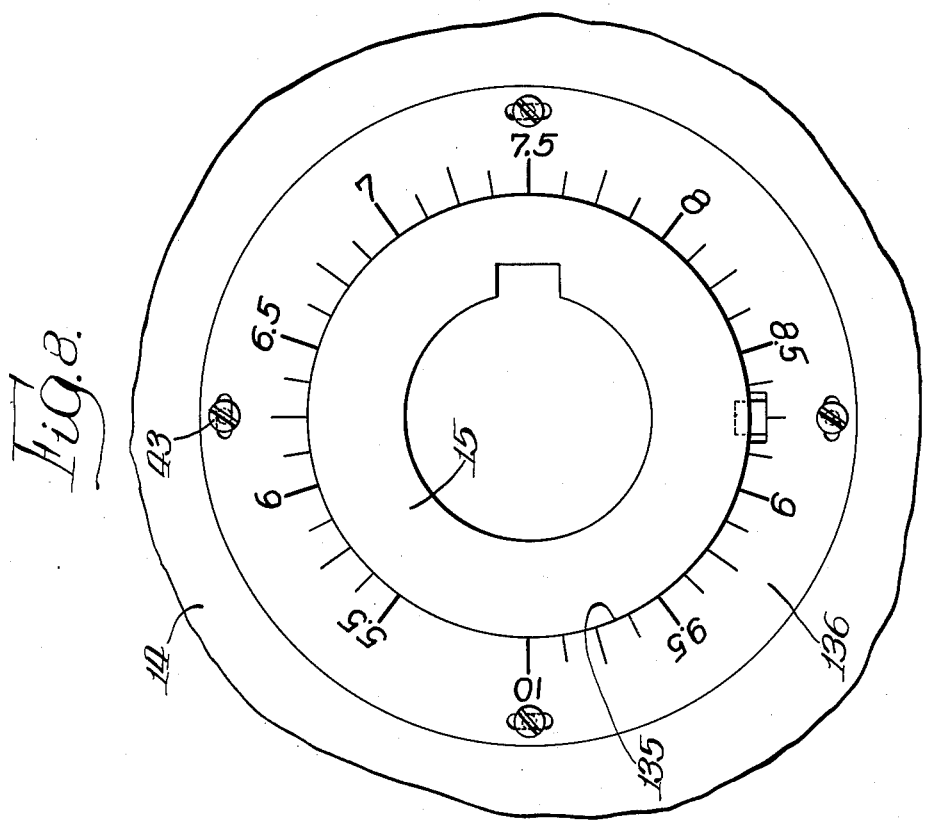
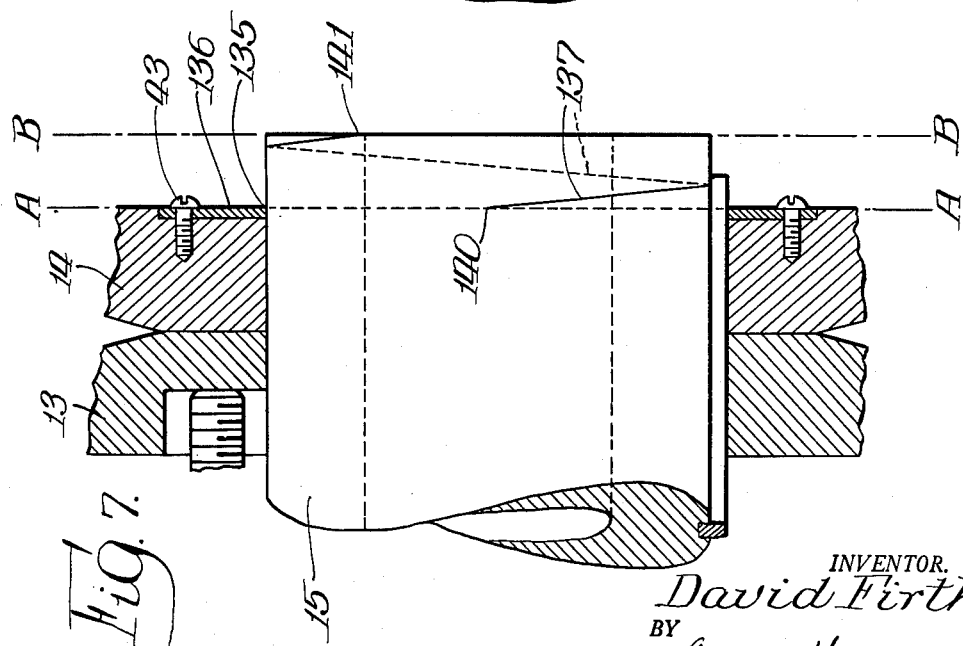
INVENTOR.
David Firth,
BY
Osgood H. Dowell
Atty.

Nov. 8, 1955
D. FIRTH
2,722,842
VARIABLE PITCH SHEAVE INDICATORS
Filed Aug. 14, 1953
6 Sheets-Sheet 4
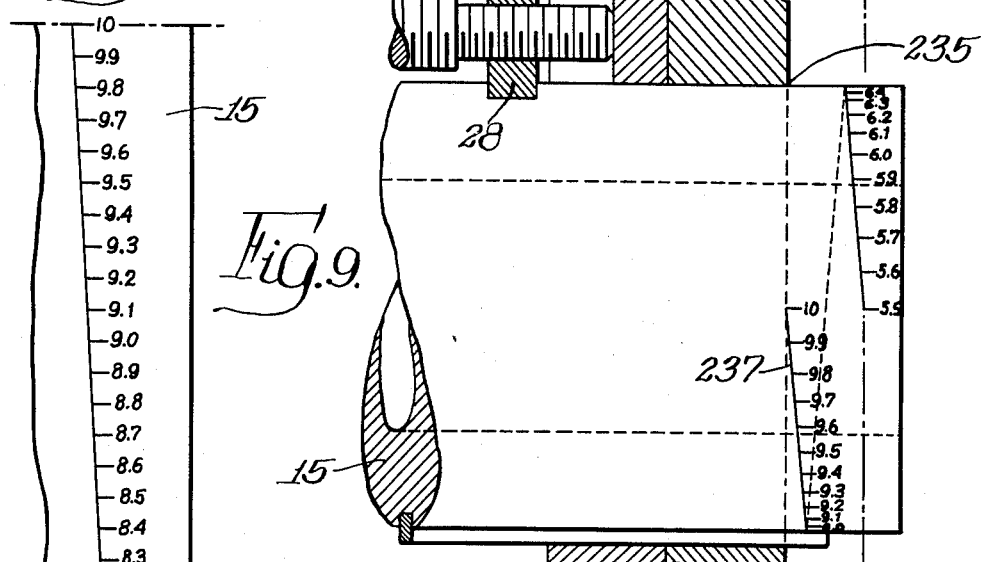
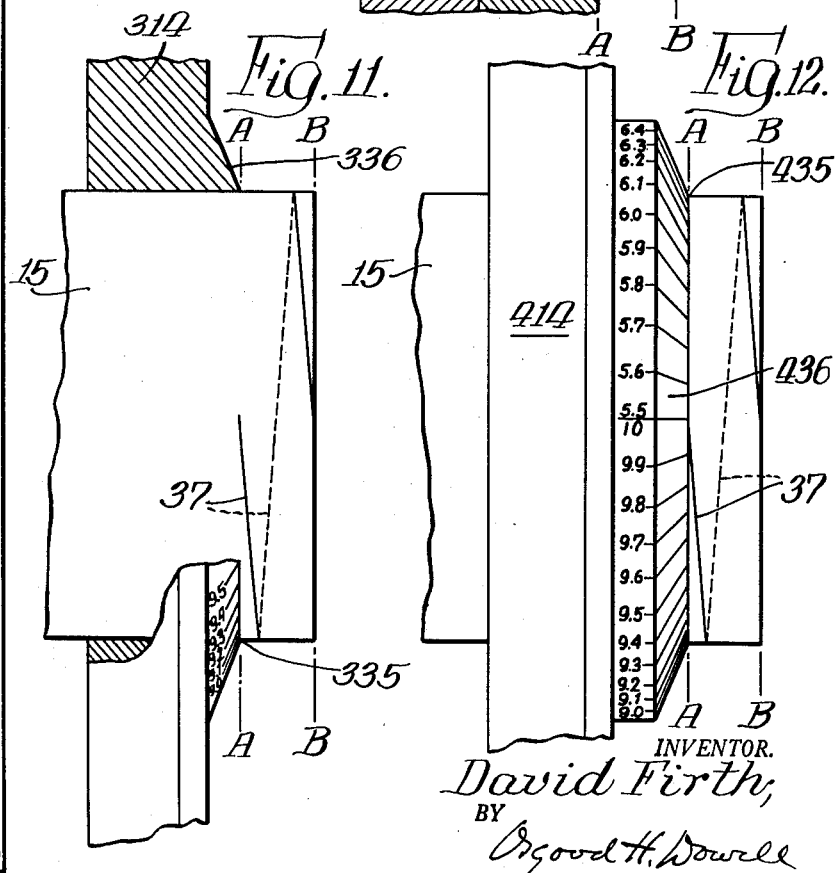
INVENTOR.
David Firth,
BY
Osgood H. Dowell
Atty.

Nov. 8, 1955 D. FIRTH 2,722,842
VARIABLE PITCH SHEAVE INDICATORS
Filed Aug. 14, 1953 6 Sheets-Sheet 5
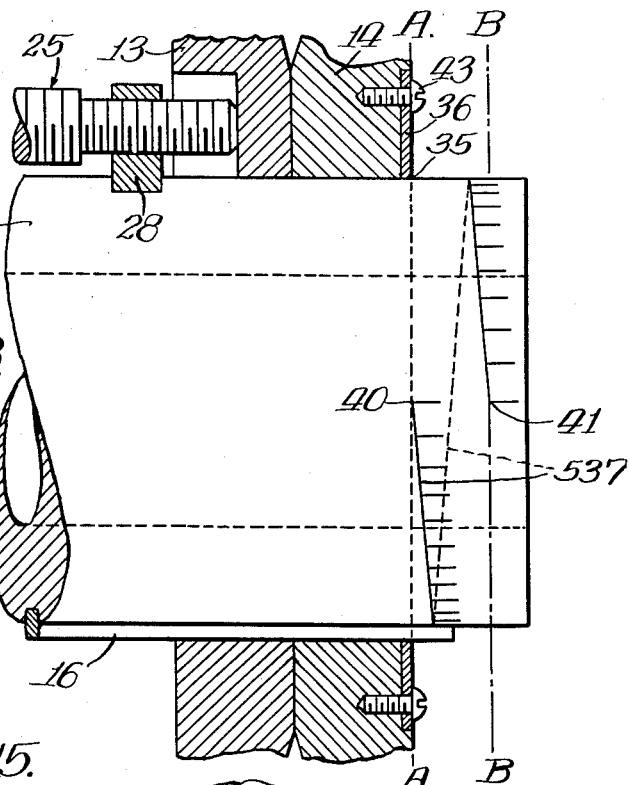
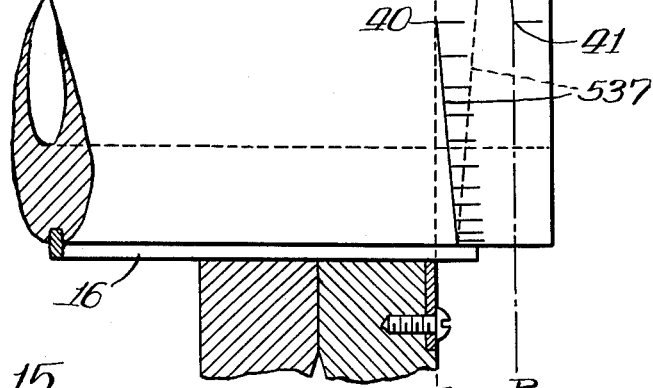
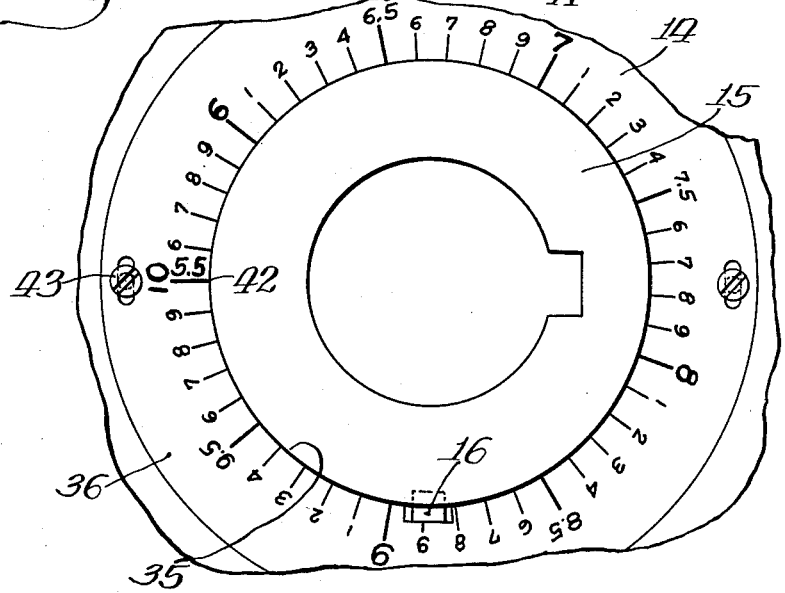
INVENTOR.
David Firth,
BY
Osgood H. Dowell
Atty.

Nov. 8, 1955 D. FIRTH 2,722,842
VARIABLE PITCH SHEAVE INDICATORS
Filed Aug. 14, 1953 6 Sheets-Sheet 6
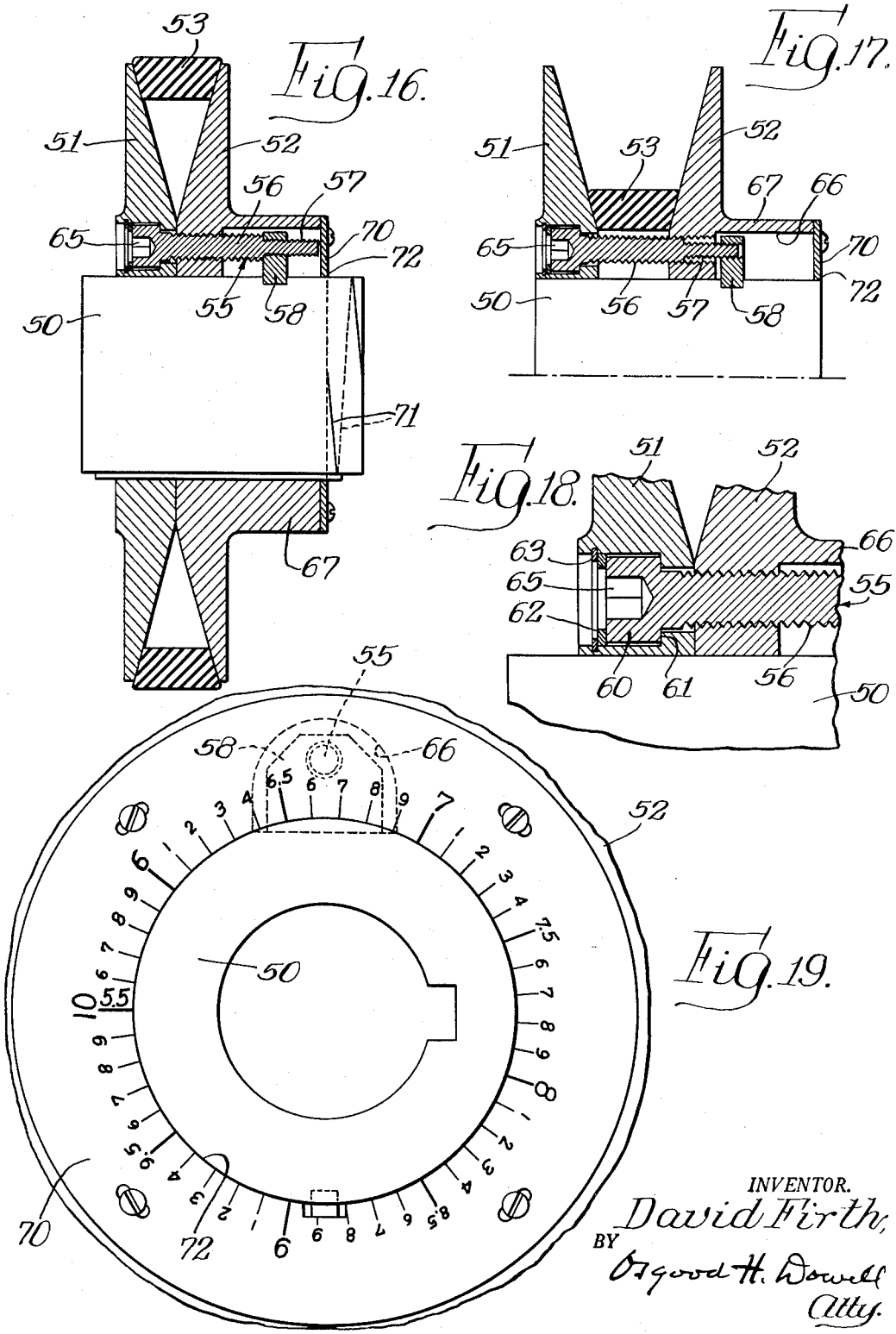
INVENTOR.
David Firth,
BY
Osgood H. Dowell
Atty.

United States Patent Office 2,722,842
Patented Nov. 8, 1955

2,722,842

VARIABLE PITCH SHEAVE INDICATORS

David Firth, South Bend, Ind., assignor to Dodge Manufacturing Corporation, Mishawaka, Ind., a corporation of Indiana Application August 14, 1953, Serial No. 374,351

10 Claims. (Cl. 74—230.17)

The operating diameter of a variable pitch V-belt sheave is dependent upon the position therein of the V-belt or belts used therewith. Adjustment of the sheave to contract the spacing between confronting sheave discs or flanges will cause the belt or belts to move outwardly in the sheave, and adjustment to expand such spacing will cause the belt or belts to move inwardly, as is well understood in the art.

The general object of the present invention is to provide, in a variable pitch V-belt sheave, practicable means for indicating belt positions therein at different adjusted positions of the sheave discs or flanges, whereby to facilitate precise setting or adjustment of the sheave to obtain a desired operating diameter.

The invention is applicable to both single groove and multi-grooved sheaves, and is not intended to be limited to any specific sheave structure.

An illustrative sheave for a two-belt drive, having the invention applied thereto in one practicable form, is shown in Figs. 1 to 6 of the accompanying drawings.

Fig. 1 is a front end elevation of said illustrative sheave, portions of the sheave discs or flanges being broken away.

Fig. 2 is a longitudinal section of said sheave taken on the line 2—2 of Fig. 1, the sheave hub being shown in elevation. This figure shows the sheave contracted for driving at maximum effective diameter, the V-belts being held by confronting discs in their outermost position in the sheave.

Fig. 3 is a longitudinal half section showing the sheave expanded for driving at minimum effective diameter, the V-belts being in the innermost position which they can assume in the sheave.

Fig. 4 is a longitudinal section taken on the bent line 4—4 of Fig. 1, looking in the direction of the arrows, outer portions of the sheave flanges being broken away.

Figs. 5 and 6, drawn on a scale twice that of the preceding figures, are views of the indicating means of the illustrative sheave, Fig. 5 being an enlarged fragment of Fig. 2, and Fig. 6 being an end elevation of the central portion of the sheave, looking at the indicator end thereof.

Figs. 7 and 8 are views corresponding to Figs. 5 and 6 showing a modified form of indicating means.

Fig. 9 is a view corresponding to Fig. 5 of another form of indicating means.

Fig. 10 is a development on a flat surface of the graduated spiral line and indicia shown on the hub in Fig. 9.

Figs. 11 and 12 are views corresponding to Fig. 5 of other modifications.

Fig. 13 is a view corresponding to Fig. 5 showing indicating means similar to that of Figs. 5 and 6 with an ancillary feature.

Fig. 14 is a development on a flat surface of the spiral line on the hub of Fig. 13.

Fig. 15 is a mutilated end view of Fig. 13 showing a portion of the dial thereon, which dial is identical to that of Fig. 6.

Fig. 16 is a longitudinal section of a single groove sheave having the invention applied thereto, the sheave discs being shown in position for driving at maximum effective diameter.

Fig. 17 is a half section of said single groove sheave adjusted for driving at minimum effective diameter.

Fig. 18 is an enlarged fragment of Fig. 13.

Fig. 19 is an enlarged end elevation of the central portion of said single groove sheave, looking at the indicator end thereof.

Referring to Figs. 1 to 6, the two-belt sheave therein shown for illustration comprises a series of annular discs 11, 12, 13 and 14 carried by and in driving connection with a hub 15 on which the discs are mounted with capacity for axial movement relative to each other and to the hub. In this instance the discs are slidably fitted on a cylindrical hub to which they are splined by the key 16. The hub is shown as a bored hub to be fitted on and keyed to a shaft and held from axial displacement by set screws 17. The sheave discs or flanges are arranged to provide grooves for the V-belts 18, one of which belts is engaged by the confronting discs 11 and 12 and the other by the confronting discs 13 and 14. The non-adjacent discs 11 and 13 engaging corresponding sides of the belts are rigidly connected in spaced relation for axial movement as a unit, as are also the opposing discs 12 and 14. The spacing and connecting means shown comprise tie-bolts or screws 20 connecting the discs 11 and 13 and interposed tubular spacers 21 slidable in the intervening disc 12, and tie-bolts or screws 22 connecting the alternate discs 12 and 14 and interposed tubular spacers 23 slidable in the intervening disc 13. The spacing of the discs of the respective shiftable units or groups of rigidly connected discs is such as to permit shifting them simultaneously equal distances in opposite directions between the positions shown in Figs. 2 and 3. Thus the illustrative sheave is of the type comprising two interarranged and oppositely axially shiftable groups of discs cooperating to form the belt grooves, being of similar body construction to that of the Firth Patent No. 2,400,294 of May 14, 1946.

The adjusting means of the illustrative sheave is of a type and construction disclosed in my copending application for adjustable sheaves, Serial No. 277,638, filed March 20, 1952, now Patent Number 2,697,947. Said adjusting means comprises a differential screw 25 arranged beside and parallel with the hub in the surrounding adjustable sheave body. The screw has a coarse threaded portion 26 extending through and in threaded engagement with an intermediate disc 12, and a fine threaded extension 27 engaged by a non-rotatable nut 28 in fixed position on the sheave hub. The disc 13 is recessed at 29 to contain said nut when the sheave discs are in the relationship shown in Fig. 3. The coarse and fine threads of the adjusting screw progress in the same direction, the screw being either right handed or left handed with respect to both threads. Due to the difference in pitch of said threads, the screw when turned will move the disc in which it is threaded in a direction opposite to that which the screw moves axially. The disc 14 being rigidly connected with said disc 12 will move axially therewith. The ends of the screw butt against the discs 11 and 13, so that axial thrust of the screw in either direction is against a disc adjacent to the intermediate one in which the screw is threaded. The discs 11 and 13 being rigidly connected will move as a unit axially with the screw. The head of the screw, rotatably fitted in a smooth-bored recess 30 in the end disc 11, has a wrench socket 31 accessible to a wrench through a hole 32 in said end disc. The pitch of the coarse thread of the screw is preferably twice that of the fine thread thereof. Hence by turning the screw the group or plurality of discs 11 and 13 and the group or plurality of alternate discs 12 and 14 can be shifted simultaneously equal distances in opposite directions, thereby changing the pitch diameter of the sheave without shifting the centers of the belt grooves, and obtaining a relatively large range of adjustment for a comparatively short travel of the screw.

Indicating means provided by the present invention is utilized in the illustrative sheave to indicate pitch diameters thereof at different adjusted positions of the sheave discs. The invention with respect to the indicating means may be embodied in different specific forms. The specific indicating means shown in Figs. 5 and 6 will be first described.

One of the end discs of the illustrative sheave, preferably the disc 14, is referred to as the indicator disc, it being a part of the indicating means. The inner edge 35 of the back side of said disc, referred to as the gauge edge, defines a circle enclosing and contiguous to the cylindrical surface of the hub 15. The plane of said gauge edge is referred to as the gauge plane. In this instance, the gauge plane is that of the face of an annular dial plate 36 which is fixed to the back of the indicator disc 14 and may be regarded as a part of said disc. When said disc is in the maximum pitch position shown in Fig. 2, the gauge plane coincides with the plane indicated by the dotted line A—A in Fig. 5, and when said disc is in the minimum pitch position shown in Fig. 3 the gauge plane coincides with that indicated by the dotted line B—B in Fig. 5. The distance between A—A and B—B is that which the indicator disc travels as it is shifted axially from one of its extreme positions to the other.

Scribed on the hub 15 is a spiral line 37 arranged to be progressively intersected by the gauge plane as it shifts with the disc 14 between its two extreme positions. In this instance the spiral line goes completely around the hub and connects points 40 and 41 in the planes A—A and B—B, both of which points lie in the same longitudinal line.

The dial plate 36 has on its face a dial or annular scale graduated by radiating division lines or marks contiguous to the edge 35, as shown for example in Fig. 6. The dial graduations and accompanying indicia are preferably etched on the dial plate. Use of an etched dial plate fixed to the indicator disc, rather than a dial inscribed on the back of said disc, is advantageous for convenience and economy in manufacture.

What may be termed the zero mark of the dial, designated in Fig. 6 by the reference numeral 42 (and shown therein with accompanying dial numbers 10 and 5.5), registers with the point 41 in the plane B—B of Fig. 5 when the indicator disc 14 is in its minimum pitch position, and with the point 40 in the plane A—A when said disc is in its maximum pitch position. The dial plate 36 is fastened to the indicator disc by screws 43 passing through arcuate slots in said plate, to permit adjusting the angular position of the dial on the indicator disc for accurate registration of the zero mark with the points 40 and 41 in the two extreme positions of the indicator disc.

As the indicator disc moves from either extreme position to the other, the gauge edge 35 thereof continually crosses the spiral line 37 on the hub, wherefore the graduation lines or marks on the dial successively meet or register with said spiral line. These marks with the aid of appropriate indicia on the dial indicate pitch diameters at the respective adjusted positions of the sheave discs at which said marks respectively register with said spiral line. Hence when the sheave is adjusted by turning the adjusting screw 25 in either direction, the operating pitch diameter thereof as adjusted will be indicated by the dial mark in registry with said spiral line, or indicated approximately by the dial mark nearest to coincidence with said spiral line.

The maximum and minimum pitch diameters being known, the pitch diameters at the positions of the sheave disc at which the dial marks respectively meet said spiral line can be easily ascertained without separate measuring or use of ordinary gauges. If the indicator disc 14 moves a part of the distance between its two extreme positions, it will cause a proportionate increase or decrease in the pitch diameter. For example, if the indicator disc moves a quarter of said distance from minimum pitch diameter position, the resultant pitch diameter will be equal to the minimum plus one fourth of the difference between the maximum and minimum pitch diameters. Hence, by dividing the dial into as many equal divisions as the number of equal units of measure into which the said difference between maximum and minimum pitch diameters can be divided, the pitch diameters denoted by the dial marks can be easily computed.

The illustrative sheave, which in the application drawings (as distinguished from the patent drawings) is shown half size in Figs. 1 to 4 and full size in Figs. 5 and 6, is designed for varying the pitch diameter from a minimum of five and a half inches to a maximum of ten inches. Thus the difference between maximum and minimum pitch diameters is four and a half inches, which equals forty-five tenths of an inch. Hence the dial is divided into forty-five equal divisions, representing tenths of inches. The individual dial marks are shown in association with indicia of the corresponding pitch diameters, though if preferred such indicia may be provided only for the dial marks denoting inches and half-inches.

The dial may be of any appropriate design to suit requirements for any particular embodiment of the invention. The dial shown in Fig. 6 is graduated to denote pitch diameters in inches and tenths thereof. Because of restricted space for indicia, the large dial figures 6, 7, 8 and 9 and the dial numeral 10 are applied to dial marks or division lines denoting inches of pitch diameter, while the intervening graduations denoting tenths of inches are designated by small dial figures. Reading the dial in a clockwise direction, the dial numeral 5.5 is followed by small dial figures 6, 7, 8 and 9, denoting pitch diameters of 5.6" to 5.9". The next dial figure 6, relatively large, is followed by small dial figures 1 to 9, denoting pitch diameters of 6.1" to 6.9". And so on around the dial to the dial numeral 10, which is applied to the same dial mark as the dial numeral 5.5.

Figs. 7 to 12 of the drawings show the indicator end portions of variable pitch sheaves similar to that hereinbefore described except for modifications of the indicating means.

Referring to Figs. 7 and 8, the spiral line 137, corresponding to but slightly greater in pitch than 37, connects points 140 and 141 in the planes A—A and B—B, which points are somewhat angularly spaced or on different longitudinal lines. In this instance the spiral line 137 or its operative length does not go completely around the hub. The angular space occupied by the dial on the dial plate 136 is correspondingly less than 360°. The dial is shown having main division lines with accompanying indicia of inches and half-inches of pitch diameter, and intervening divisions corresponding to quarters and eighths of inches. When the sheave discs are in minimum pitch position, the first or zero dial mark, designated by the dial numeral 5.5, registers with the point 141, and when the discs are in maximum pitch position the last dial mark 10 registers with the point 140. The operation is the same as that of the indicating means first described. As the indicator disc 14 moves from either extreme position to the other, the dial marks are successively registered with the spiral line 137, and the pitch diameter of the sheave at any adjusted position of the sheave discs will be indicated by the dial mark in registry with or most nearly coincident with said spiral line.

Fig. 9 discloses a species of the invention having an indicating dial engraved on the sheave hub adjacent to the spiral line thereon. Here the spiral line 237, connecting points in the planes A—A and B—B, is itself graduated by dial lines or marks with associated indicia of pitch diameters. A development on a flat surface of said spiral line and associated dial is shown in Fig. 10. Said spiral line 237 is shown as identical in pitch and angular extent to 37 in Fig. 5, though that is but exemplary. It will be understood that as the sheave discs are shifted from either extreme position to the other, the gauge plane of the indicator disc 14, which in this instance is the plane of the back surface of said disc, shifts from A—A to B—B or vice versa, and successively registers with the points where the dial marks meet the spiral line 237. In other words, the dial marks successively register with successive points of intersection of said spiral line by the gauge plane. The pitch diameter of the sheave at any adjusted position of the sheave discs is indicated by the dial mark coinciding or most nearly in coincidence with the gauge edge 235 of the indicator disc.

Fig. 11 shows a modification wherein the indicator disc designated by the numeral 314, is formed on its back side with a central conical protrusion 336 on which the indicating dial (only partially shown) is engraved with its division lines radiating from the gauge edge 335. The plane of said edge is the gauge plane, which in one extreme position of the sheave discs coincides with A—A and in the other extreme position coincides with B—B. Thus the indicating means of Fig. 11 is the same as in Figs. 5 and 6, except that in Fig. 11 the dial is formed on a conical surface to facilitate reading.

Fig. 12 shows another modification for still further clearness of indication. Here the indicator disc, designated by the numeral 414, is formed on its back side with a central extension 436 having a cylindrical surface adjacent to the back surface of the belt-engaging portion of said disc and a conical surface extending from said cylindrical surface to the gauge edge 435. In this instance the dial marks or division lines radiate from said gauge edge 435 on said conical surface and extend onto said cylindrical surface where they are associated with indicia of the pitch diameters.

Referring to Figs. 13, 14 and 15, the device therein illustrated is substantially the same as that of Figs. 1 to 6 except that in Figs. 13, 14 and 15 the spiral line, designated by the numeral 537, is graduated in the same manner as in Figs. 9 and 10, by division lines on the hub extending longitudinally thereof from said spiral line, the hub being extended beyond the point 41 to allow room on the hub for said lines. Thus the device of Figs. 13, 14 and 15 combines the indicating means of Figs. 5 and 6 with the feature of a graduated spiral line on the hub, preferably omitting indicia on the hub. In operation, the graduation marks on the dial plate 36 will register successively with said spiral line at the points from which the division lines on the hub meet said spiral line. This may be of advantage to assist in easy and accurate reading of the dial.

The embodiment of the invention shown in Figs. 13, 14 and 15 includes two annular series of graduation marks or division lines, one being on the dial and the other on the hub, these series being correlated for the purpose stated in the preceding paragraph hereof. In this case, indicia of pitch diameters may be associated with either series of graduation marks.

Referring to Figs. 16 to 19, the single groove sheave therein shown comprises a pair of confronting discs 51 and 52 engaging an interposed V-belt 53, said discs being slidably fitted on and splined to the hub 50. The means shown for adjusting the sheave is of a type and construction disclosed in my copending application Serial No. 277,639, filed March 20, 1952, now Patent No. 2,718,155, dated September 20, 1955. In this instance the discs are connected by a differential screw 55 swiveled to 51 and threaded in 52, said screw having a coarse-threaded portion 56 screwed into 52 and a fine-threaded extension 57 engaged by a non-rotatable nut 58 in fixed position on the hub. The coarse and fine threads of the screw progress in the same direction, the pitch of the coarse thread being twice that of the fine thread. By turning the screw, the discs can be shifted simultaneously equal distances in opposite directions between the positions shown in Figs. 16 and 17.

Means for swiveling the adjusting screw 55 to the disc 51 is shown on an enlarged scale in Fig. 18. As shown, the cylindrical head 60 of the screw is rotatably fitted in a recess therefor in said disc, which recess is open at its front end and extends part way through the disc to a portion thereof providing the shoulder 61. The last mentioned portion of said disc is apertured for passage of the screw shank loosely therethrough. The screw head 60 is held in abutting relation to the shoulder 61 by a washer 62 which is held in abutting relation to the screw head by a snap ring 63 sprung into an annular groove in the wall of said recess. The screw head is provided with a wrench socket 65 for engagement by a wrench for operating the screw.

The disc 52 is formed to house the nut 58 and so much of the adjusting screw as extends rearwardly from the screw hole therefor in said disc. As shown, said nut and portion of the screw are contained in a recess 66 in a rearward extension of the central portion of said disc, said extension forming an annular boss 67 to which is fixed a dial plate 70 for coaction with the spiral line 71 on the sheave hub.

Any indicating means hereinbefore described as applied to a plural-belt sheave may be utilized in a single groove sheave. The indicating means shown for example in the sheave of Figs. 16 to 19 is in accordance with the species of the invention shown in Figs. 5 and 6. In this instance the disc 52 is utilized as the indicator disc, the gauge plane thereof being that of the dial on the etched dial plate 70. As the sheave discs are shifted from maximum to minimum pitch position or vice versa, the gauge edge 72, shifting from one to the other of the planes A—A and B—B, continually crosses the spiral line 71 and registers successively with the dial marks on 70. The pitch diameter of the sheave at any adjusted position of the discs is indicated by the dial mark in registry or nearest in registry to said spiral line. It will be understood that the dial marks and indicia should be appropriate to the difference between maximum and minimum pitch diameters. For example, if the difference between such diameters of the sheave of Figs. 16 to 19 is the same as in the two-belt sheaves previously described, the dial on the etched plate 70 and the spiral line 71 may be identical to those of Figs. 5 and 6, and are so shown as identical, only for example.

In the several embodiments of the invention herein described, the dial marks are utilized with appropriate indicia to indicate pitch diameters. The same dial marks could be used with other appropriate indicia to indicate corresponding radial distances or twice such distances from the sheave axis to either the inner or outer surface of the sheave belt or belts. The positions assumed by the belt or belts in the sheave at different adjusted positions of the sheave discs may be indicated either by indicating the corresponding pitch diameters or by indicating the corresponding radial distances above mentioned or twice such distances. Expressions in the appended claims as to indicating belt positions are intended to be construed accordingly.

Notice is given that plural belt and single belt sheaves having the respective adjusting means herein described embody inventions respectively described and claimed in my said applications Serial Nos. 277,638 and 277,639.

I claim:

1. A variable pitch V-belt sheave comprising opposing belt-engaging discs, a cylindrical hub on which said discs are mounted for adjustability of their relative positions, screw means connected to said hub and discs for adjustably positioning the discs relative to the hub and to each other, and means including a spiral line on the hub and a gauge edge of one of said discs for indicating belt positions in the sheave at different adjusted positions of the discs.

2. A variable pitch V-belt sheave comprising opposing belt-engaging discs, a cylindrical hub on which said discs are mounted for adjustability of their relative positions, screw means connected to said hub and discs for adjustably positioning the discs relative to the hub and to each other, one of said discs being an indicator disc slidably fitted on said hub and movable axially in the adjusting operation, said indicator disc having an exposed back side the inner edge of which constitutes a gauge edge contiguous to the hub, a spiral line on the hub arranged to be continually crossed by said gauge edge as said indicator disc is shifted, and a dial on said indicator disc comprising graduation marks contiguous to said gauge edge for successive registry with said spiral line to indicate belt positions in the sheave at different adjusted positions of said discs.

3. A variable pitch V-belt sheave according to claim 2 wherein the dial is divided into as many equal divisions as the number of equal fractions of a standard unit of measure into which the difference between the maximum and minimum pitch diameters of the sheave can be divided.

4. A variable pitch V-belt sheave according to claim 2 wherein the dial is provided by an etched plate affixed to the back side of the indicator disc.

5. A variable pitch V-belt sheave according to claim 2 wherein the indicator disc has on its back side a central conical extension and said dial is on said back side and graduated by division lines radiating from said gauge edge on the conical surface of said extension.

6. A variable pitch V-belt sheave according to claim 2 wherein the indicator disc has on its back side a central extension with a cylindrical surface adjacent to said back side and a conical surface extending from said cylindrical surface to said gauge edge, the dial being on said extension and graduated by division lines radiating from said gauge edge on said conical surface and leading to indicia on said cylindrical surface.

7. In a variable pitch V-belt sheave, an indicator disc movable axially in the operation of adjusting the pitch diameter, a cylindrical hub on which said disc is slidably fitted, a spiral line on said hub arranged to be continually intersected by the plane of the inner edge of the back side of said disc as it is shifted, and a dial on said disc having graduation marks contiguous to said edge for successive registry with successive points of intersection of said spiral line by said plane for indicating belt positions in the sheave at different positions of said disc.

8. A variable pitch V-belt sheave comprising opposing belt-engaging discs, a cylindrical hub on which said discs are mounted for adjustability of their relative positions, screw means connected to said hub and discs for adjustably positioning the discs relative to the hub and to each other, one of said discs being an indicator disc slidably fitted on said hub and movable axially in the adjusting operation, said indicator disc having an exposed back side the inner edge of which constitutes a gauge edge contiguous to the hub, a spiral line on the hub arranged to be continually crossed by said gauge edge as said indicator disc is shifted, and a dial on the hub comprising graduation marks contiguous to said spiral line for successive registry with said gauge edge to indicate belt positions in the sheave at different adjusted positions of said discs.

9. A variable pitch V-belt sheave according to claim 8 wherein the dial is divided into as many equal divisions as the number of equal fractions of a standard unit of measure into which the difference between the maximum and minimum pitch diameters of the sheave can be divided.

10. In a variable pitch V-belt sheave, an indicator disc movable axially in the operation of adjusting the pitch diameter, a cylindrical hub on which said disc is slidably fitted, a spiral line on said hub arranged to be continually interesected by the plane of the inner edge of the back side of said disc as it is shifted, and a dial on said hub having graduation marks contiguous to said spiral line for successive registry with said edge to indicate belt positions in the sheave at different positions of said disc.

References Cited in the file of this patent
UNITED STATES PATENTS

| | | |
|---|---|---|
| 1,881,028 | Meyer | Oct. 4, 1932 |
| 2,289,965 | Herman | July 14, 1942 |
| 2,545,327 | Williams | Mar. 13, 1951 |